United States Patent [19]
Zimmer et al.

[11] Patent Number: 6,136,919
[45] Date of Patent: *Oct. 24, 2000

[54] RUBBER COMPOSITION AND TIRE HAVING TREAD THEREOF

[75] Inventors: René Jean Zimmer, Howald; Friedrich Visel, Bofferdange, both of Luxembourg; Uwe Ernst Frank, Marpingen, Germany; Thierry Florent Edmé Materne, Attert, Belgium; Giorgio Agostini, Colmar-Berg, Luxembourg

[73] Assignee: The Goodyear Tire & Rubber Company, Akron, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 09/085,203

[22] Filed: May 27, 1998

[51] Int. Cl.$^7$ ...................................................... C08F 36/04
[52] U.S. Cl. .......................... 524/856; 524/571; 524/575; 524/847; 523/215; 523/216; 152/450
[58] Field of Search ..................... 524/856, 571, 524/575, 855, 789, 790, 847; 525/106, 192, 232, 236, 237; 152/450; 526/129, 160, 164, 340; 523/215, 216

[56] References Cited

U.S. PATENT DOCUMENTS

| | | | |
|---|---|---|---|
| 2,512,697 | 6/1950 | Grotenhuis | 524/856 X |
| 3,256,236 | 6/1966 | Herman et al. | 524/855 X |
| 3,867,326 | 2/1975 | Rivin et al. | 524/575 X |
| 4,390,648 | 6/1983 | Stacy | 524/575 X |
| 5,780,537 | 7/1998 | Smith et al. | 524/575 X |

FOREIGN PATENT DOCUMENTS

| | | |
|---|---|---|
| 1349864 | 1/1961 | France . |
| 1475001 | 2/1966 | France . |

OTHER PUBLICATIONS

Chemical Abstracts, vol. 99, No. 22; Nov. 28, 1983, X)002113392 and JP 58 061107.

European Search Report.

*Primary Examiner*—Fred Teskin
*Attorney, Agent, or Firm*—H C Young, Jr.

[57] ABSTRACT

A method of preparing a pre-formed elastomer/filler composite of a diene-based elastomer and particulate filler dispersed therein by polymerizing monomers in the presence of said filler with a polymerization promoting catalyst in which at least a portion of said catalyst is pre-deposited on said filler. Such pre-formed elastomer composite is also contemplated as well as a rubber composition comprised of a blend of such pre-formed composite and at least one additional elastomer. Such filler may be, for example, precipitated silica, carbon black and/or a modified carbon black. A tire having a component of such composite or rubber composition such as, for example a tread, is also provided.

49 Claims, No Drawings

RUBBER COMPOSITION AND TIRE HAVING TREAD THEREOF

FIELD

This invention relates to preparation of a pre-formed elastomer composite as a diene-based elastomer and particulate filler dispersed therein by polymerizing monomers in the presence of the filler, wherein the portion of the polymerization catalyst is contained on a pre-treated filler. The pre-formed elastomer composite is also contemplated as well as a rubber composition containing such an elastomer composite. Further, a tire having a component such as, for example a tread, comprised of such elastomer composite or rubber composition is contemplated.

BACKGROUND

Tires are typically prepared of treads of elastomer based rubber compositions which are conventionally carbon black reinforced. Sometimes tire tread rubber compositions are also silica reinforced often with an inclusion of a coupling agent to aid in coupling the reinforcing filler to the rubber.

It is sometimes desired to enhance a homogeneous dispersion of the reinforcing filler in the rubber composition such as, for example, by for efficient or more prolonged mixing of the rubber composition or by other means.

According to WO96/34900 patent publication, a polyolefin composite might be prepared by polymerizing olefin(s) in the presence of (i) a transition metal catalyst, (ii) co-catalyst or activator for said transition metal catalyst, and (iii) filler. The product is said to be obtainable as free flowing particles which may be processed into shaped articles such as, for example, injection molding, rotational molding, compression molding, profile extrusion, flat-die film extrusion and co-extrusion.

However, it is desired herein to produce elastomeric compositions containing integral reinforcing fillers. It is considered herein that the preparation of such reinforcing filler-containing elastomers is not addressed by said WO patent publication.

The term "phr" if used herein, and according to conventional practice, refers to "parts of a respective material per 100 parts by weight of rubber, or elastomer".

In the description of this invention, the terms "rubber" and "elastomer" if used herein, may be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

SUMMARY AND PRACTICE OF THE INVENTION

In accordance with this invention, a method of preparing a diene-based elastomer/filler composite, namely, a pre-formed elastomer containing an integral filler dispersion therein, comprises (A) polymerizing at least one conjugated diene hydrocarbon or copolymerizing at least one conjugated diene hydrocarbon and a aromatic vinyl compound in an organic solvent and in the presence of (1) polymerization promoting catalyst and (2) at least one particulate filler selected from at least one of carbon black and precipitated silica and (B) terminating the polymerization reaction; wherein said elastomer composite contains from about 10 to about 100 phr of said filler; wherein said catalyst is a combination of a first co-catalyst selected from at least one of a Group 4, 5 or 6 transition metal compound, a metalocene, a lanthanide, actinide organocobalt and organonickel compound and a second co-catalyst selected from at least one of an organoaluminum, organozinc and organomagnesium compound; and wherein said catalyst combination is provided as (i)at least one of said fillers as a pre-treated filler having said first co-catalyst on the surface thereof and said second co-catalyst being added to the monomer/solvent/filler mixture or (ii) at least one of said fillers as a pre-treated filler having said second co-catalyst on the surface thereof and said first co-catalyst being added to the monomer/solvent/filler mixture.

The invention further contemplates a rubber composition comprised of the said pre-formed elastomer/filler composite of this invention and a diene-based elastomer.

The invention additionally contemplates a tire having at least one component comprised of such elastomer composite or of such rubber composition.

The invention additionally contemplates such a tire having a tread comprised of such elastomer composite or of such composition.

The carbon black filler for this invention is a rubber reinforcing carbon black, as would be understood by one having skill in the rubber compounding art. Examples of such carbon blacks are described in *The Vanderbilt Rubber Handbook*, 13$^{th}$ *Edition*, and pages 417–418.

In another aspect of the invention, the modified carbon black filler is such a carbon black which has been treated to contain at least one moiety selected from silanol, siloxane, titanium oxide, titanium hydroxide, zirconium oxide, zirconium hydroxide and aluminum hydroxide groups on the surface thereof.

Modified carbon blacks are also contemplated as carbon blacks containing at least one of aryl polysulfide, alkyl polysulfide, thiol, thiophenol, epoxide, allyl and vinyl groups on the surface thereof. Representative aryl polysulfide groups are, for example, dibenzyldisulfide and ditolyldisulfide. Representative alkyl polysulfide groups are, for example, bis(propyl)disulfide and bis(propyl)tetrasulfide. Representative thiol groups are, for example, n-propyl thiol and n-butyl thiol. Representative of thiophenol groups is, for example, orthomethylthiophenol. Representative epoxide groups are, for example, n-propyl epoxide and n-butyl epoxide. Representative allyl groups are, for example, methyl allyl and propyl allyl groups. Representative vinyl groups are, for example, methyl vinyl and propyl vinyl groups.

For the preparation of said pre-formed elastomer/filler composite of this invention, representative of diene monomers are conjugated dienes such as isoprene and 1,3-butadiene. Representative of aromatic vinyl compounds are styrene and alpha-methylstyrene, preferably styrene. Also, for the rubber composition of this invention comprised of the pre-formed elastomer/filler composite and at least one additional elastomer, said additional elastomer is preferably selected from homopolymers and copolymers of such dienes and from copolymers of one or more of such dienes and an aromatic vinyl compound are contemplated.

It is to be appreciated that additional carbon black and/or silica may be used in the preparation of such rubber composition where at least one additional elastomer is used with said pre-formed elastomer/filler composite to form the rubber composition.

For this invention, diene-based elastomers (rubbers) prepared from such monomers are also contemplated for the rubber compositions for the elastomer composite/rubber blend.

In another aspect of this invention, the diene-based elastomer may be tin or silicon coupled.

Historically, aluminum/magnesium/titanium based catalysts are used to polymerize monoolefins to form thermoplastic polymers such as, for example, polyethylene.

However, for the preparation of the pre-formed elastomer composite, it is considered herein that such catalyst combination would be inappropriate.

It is to be appreciated that it is an important aspect of this invention for the preparation of the pre-formed elastomer/filler composite, that one component of the polymerization catalyst is provided as a pre-treated filler composite. In the practice of this invention, the pre-treated filler composite is a filler which contains said first or second co-catalyst on its surface. Such filler composite may be obtained, or pre-treated, for example, by mixing a dehydrated filler in an organic diluent with a first or second co-catalyst, as the case may be, followed by drying the resulting filler composite. The filler may be dehydrated by conventional means well known to those skilled in such art.

While various polymerization catalysts, or catalyst systems, may be used for polymerizing the diene monomers to form a primarily diene-based elastomer may be used, preferred catalysts are (1) Ziegler-Natta type of catalyst and (2) metallocene type of catalysts are preferred. Such catalysts and their use to polymerize diene-based monomers to form elastomers are well known to those having skill in such art.

Representative examples of a Ziegler-Natta type of catalyst may be found, for example, in publications such as *Textbook of Polymer Science*, by F. W. Billmeyer Jr.

For the first co-catalyst, representative examples of Group 4, 5 or 6 transition metal compounds are, for example, halides of titanium, vanadium, niobium and chromium. Chlorine is a preferable halide. Representative of such compounds are, for example, titanium chloride (titanium tetrachloride), vanadium chloride, niobium chloride and chromium chloride.

Additional first co-catalysts may include as well as orga-nocobalt and organonickel compounds.

Representative of organocobalt and organonickel compounds are, for example, cobalt octanoate and nickel octanoate.

For said first co-catalyst, representative examples of a lanthanide are, for example, neodymium chloride, neodymium alkoxide, cerium chloride, and ytterbium chloride.

For said first co-catalyst, a representative example of an actinide is, for example, uranyl dichloride.

For said first co-catalyst, representative examples of a metallocene type of catalyst may be found, for example, in *Metallocene Catalyzed Polymers* published by Plastics Design Library-The Society of Plastics Engineers (1998).

Representative of metallocene catalysts are, for example, cyclopentadienyl titanium dichloride, aluminum dialkylchloride, cyclopentadienlyl and cobalt(dimethyl) trialkyl phosphate.

For said second co-catalyst, representative examples are, for example, organoaluminum compounds, for example, trialkyl alkyluminum, dialkylaluminum halide and ethylaluminum dichloride, particularly where the alkyl groups are selected from at least one of methyl, ethyl and butyl groups and the halide is chlorine. For example, such organoaluminum compounds may be triethylaluminum, tributylaluminum, trimethylaluminum, ethylaluminum dichloride and triisobutylaluminum.

For said second co-catalyst, additional examples are dialkylzinc and butyl magnesium chloride.

In this invention, for the use of a diene polymerization promoting catalyst in the presence of a selected filler, the type of bonding to the filler surface, while it may not be fully understood, is contemplated to be:

1. Co-catalyst promoting a direct covalent bond activity with the surface of the filler, particularly with active groups on the surface of the filler. An example of such approach may be found, for example, in *Agnew. Chem*, vol. 108, page 2979 (1995). Exemplary of a representation of such filler surface activity may be, for example, where a portion of the surface of the filler itself is represented by a silanol group and where the catalyst component is, for example, imido tri(neopentyl) molybene.

2. First co-catalyst adsorption onto the filler surface. By this method, a further reaction uses a second co-catalyst, which is added along with the monomer to the polymerization system, to convert an adsorbed species of cobalt, nickel neodinium, and/or titanium into the active catalyst system.

3. Alternatively, a second co-catalyst is adsorbed onto the filler surface and the first co-catalyst added along with the monomer in the polymerization system to complete an active catalyst formation.

The polymerization might be conducted, for example, in the following manner: (1) dehydrating the filler in a suitable oven to a temperature of about 200° C. for about two hours, (2) mixing the dehydrated filler with an organic hydrocarbon solvent such as, for example, toluene, pentane, hexane and/or heptane, to create a dispersion therein, (3) adding a first or second co-catalyst, as the case may be, and allowing it to react with hydroxyl groups contained on the surface of the filler to form the filler composite of this invention, followed by (4) addition of a diene hydrocarbon monomer and first or second co-catalyst, as the case may be, (5) allowing a polymerization of the monomer to proceed and form an elastomeric polymer, (6) stopping the polymerization reaction by addition of a monoalcohol such as, for example, methanol and cooling the polymerizate and, then (7) recovering the diene-based elastomeric polymer composite by filtration and drying the recovered elastomer under vacuum (reduced pressure) to remove the solvent.

It is envisioned that the product is recovered as an elastomeric composition which contains an integral filler dispersion therein.

In the practice of this invention, a silica coupler may be used for coupling the silica, and optionally the modified carbon black, to one or more of the elastomers in the rubber composition. Such silica coupler conventionally has a moiety, preferably a silane moiety, reactive with (i) at least one of said moieties on the surface of said modified carbon black, and (ii) with silanol groups on said silica, if silica is used, and another moiety interactive with at least one of said elastomer(s).

Typical of such coupling agents are bis-3-(trialkoxysilylalkyl) polysulfides. Representative thereof are, for example, bis-3-(triethoxysilylpropyl) polysulfide having an average of from about 2.1 to about 4 sulfur atoms in its polysulfidic bridge.

Also, in the practice of this invention, while use of various elastomers are contemplated as hereinbefore discussed, such elastomers may be, for example, selected from at least one of cis 1,4-polyisoprene rubber (natural and/or synthetic, and preferably natural rubber), 3,4-polyisoprene rubber, styrene/butadiene copolymer rubbers, isoprene/butadiene copolymer rubbers, styrene/isoprene copolymer rubbers, styrene/ isoprene/butadiene terpolymer rubbers, cis 1,4-polybutadiene rubber, trans 1,4-polybutadiene rubber (70–95 percent trans), low vinyl polybutadiene rubber (10–30 percent vinyl), medium vinyl polybutadiene rubber (30–50 percent vinyl) and high vinyl polybutadiene rubber (50–90 percent vinyl).

The vulcanized rubber composition should contain a sufficient amount of the pre-formed elastomer/filler composite, usually at least about 30, and usually greater than about 40, phr, to contribute a reasonably high modulus, high abrasion resistance and resistance to tear for the cured rubber composition.

In the practice of this invention, silica may be present in levels below about 100 phr such as, for example, about 10 to about 90 phr, or not at all.

The commonly employed siliceous pigments used in rubber compounding applications can be used as the silica in this invention, including pyrogenic and precipitated siliceous pigments, including aluminosilicates, although precipitated silicas are usually preferred.

The siliceous pigments preferably employed in this invention are precipitated silicas such as, for example, those obtained by the acidification of a soluble silicate, e.g., sodium silicate, generally exclusive of silica gels.

Such silicas might be characterized, for example, by having a BET surface area, as measured using nitrogen gas, preferably in the range of about 40 to about 600, and more usually in a range of about 50 to about 300 square meters per gram ($m^2/g$). The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300 cc/100 gm.

The silica might be expected to have an average ultimate particle size, for example, in the range of 0.003 to 0.05 micron as determined by the electron microscope, although the silica particles may be even smaller, or possibly larger, in size.

The silica may also be expected to have mercury porosimetry characteristics such as, for example, HgSSA in a range of about 50 to about 200 $m^2/g$, a V(Hg) in a range of about 1 to about 3.5 $cm^3/g$ and a PSD max between 10 to about 50 nm.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Zeosil 1165MP and silicas available from Degussa A. G. with, for example, designations VN2 and VN3, BV3380GR, etc. and from Huber as Zeopol 8745.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Reinforcing type carbon blacks(s) may also be added to the rubber composition, depending somewhat upon the physical properties desired and intended use of the rubber composition.

It is to be appreciated that the silica coupler and/or the silica silylating agent, if in a liquid form, may be used in conjunction with a carbon black carrier, namely, pre-mixed with a carbon black prior to the addition to the rubber composition, and such carbon black is to be included in the aforesaid amount of carbon black accounted for in the rubber composition formulation.

Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), pages 344–346. Typical amounts of antiozonants comprise about 1 to 5 phr.

Typical amounts of fatty acids, if used, which can include stearic acid, palmitic acid, linoleic acid or mixtures of one or more fatty acids, can comprise about 0.5 to about 3 phr.

Often stearic acid is used in a relatively impure state and is commonly referred to in the rubber compounding practice as "stearic acid" and is so referred to in the description and practice of this invention.

Typical amounts of zinc oxide comprise about 2 to about 5 phr. Typical amounts of waxes comprise about 1 to about 5 phr. Often microcrystalline waxes are used. Typical amounts of peptizers, if used, comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1 to about 2.5, sometimes from about 1 to about 2, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2, phr. In another embodiment, combinations of a primary and a secondary accelerator might be used with the secondary accelerator being used in amounts of about 0.05 to about 3 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the use of the prescribed silylating agent in combination with a silica coupler in a silica reinforced rubber composition.

The presence and relative amounts of the other additives, as hereinbefore described, are not considered to be an aspect of the present invention which is more primarily directed to the utilization of the prescribed pre-formed elastomer/filler composite.

The ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage (s). The rubber, silica, silica coupler, silica silylating agent, and carbon black if used, are mixed in one or more non-productive mix stages. The terms "non-productive" and "productive" mix stages are well known to those having skill in the rubber mixing art.

In at least one of the non-productive (NP) mixing stages, the materials are thermomechanically mixed and the mixing temperature is allowed to reach a temperature between 140° C. and 190° C.

The rubber composition of this invention can be used for various purposes. For example, it can be used for various tire compounds. Such tires can be built, shaped, molded and cured by various methods which are known and will be readily apparent to those having skill in such art.

The invention may be better understood by reference to the following examples in which the parts and percentages are by weight unless otherwise indicated.

EXAMPLE I

For this Example, a pre-formed elastomer/dispersed filler composite is prepared as follows:

A pre-treated filler is prepared by first dehydrating particulate, precipitated silica as Zeosil 1165 MP from Rhone Poulenc, in an oven for about two hours to a temperature of about 200° C. The dehydrated silica is then cooled to about 23° C. and mixed, in a heptane solvent. A tri-ethyl aluminum second co-catalyst is added and allowed to react with silanol groups on the surface of the silica. To the silica/catalyst composite dispersion in the organic solvent is added 1,3-butadiene monomer together with a cobalt octanoate first co-catalyst.

The polymerization is allowed to proceed for about 1.5 hour at about 65° C. to about an 80 percent completion of the polymerization reaction. The polymerization was stopped with the addition of methanol and the resulting polymerizate cooled to about zero ° C. and the elastomer/filler composite then recovered by drying to a temperature of about 23° C.

The resulting styrene/butadiene copolymer elastomer has a cis 1,4-content of about 90 percent and contained about 30 weight percent integrally dispersed silica therein.

EXAMPLE II

An elastomer composition is prepared by mixing about 50 phr of the pre-formed elastomer/filler composite of Example I with about 60 phr of an additional organic solution polymerization prepared styrene/butadiene elastomer and rubber compounding ingredients which include conventional amounts of zinc oxide and stearic acid for about 6 minutes to a temperature of about 160° C. Sulfur and vulcanization accelerators are then mixed with the resulting composition for about 2 minutes to a temperature of about 120° C. The resulting rubber composition is cured for about 14 minutes to a temperature of about 160° C.

While certain representative embodiments and details have been shown for the purpose of illustrating the invention, it will be apparent to those skilled in this art that various changes and modifications may be made therein without departing from the spirit or scope of the invention.

What is claimed is:

1. A method of preparing a diene-based elastomer composite containing a particulate filler dispersion therein comprises (A) polymerizing at least one conjugated diene hydrocarbon or copolymerizing at least one conjugated diene hydrocarbon and a aromatic vinyl compound in an organic solvent and in the presence of (1) polymerization promoting catalyst and (2) at least one particulate filler selected from at least one of carbon black and precipitated silica and (B) terminating the polymerization reaction; wherein said elastomer composite contains from about 10 to about 100 phr of said filler; wherein said catalyst is a combination of a first co-catalyst as a metallocene catalyst component and a second co-catalyst selected from at least one of an organoaluminum, organozinc and organomagnesium compound; and wherein said catalyst combination is provided as (i) at least one of said fillers as a pre-treated filler having said first co-catalyst on the surface thereof and said second co-catalyst being added to the monomer/solvent/filler mixture or (ii) at least one of said fillers as a pre-treated filler having said second co-catalyst on the surface thereof and said first co-catalyst being added to the monomer/solvent/filler mixture.

2. The method of claim 1 wherein said carbon black is a rubber reinforcing carbon black modified by having at least one moiety selected from silanol, siloxane, titanium oxide, titanium hydroxide, zirconium oxide, zirconium hydroxide and aluminum hydroxide groups on the surface thereof.

3. The method of claim 1 wherein said carbon black contains at least one of aryl polysulfide, alkyl polysulfide, thiol, thiophenol, epoxide, allyl and vinyl groups on the surface thereof.

4. The method of claim 1 wherein said carbon black contains at least one of dibenzyldisulfide, ditolyldisulfide, bis(propyl)disulfide, bis(propyl)tetrasulfide, n-propyl thiol, n-butyl thiol, orthomethylthiophenol, n-propyl epoxide, n-butyl epoxide, methyl allyl, propyl allyl, methyl vinyl and propyl vinyl groups on the surface thereof.

5. The method of claim 1 wherein said pre-treated filler is prepared by solvent deposition of the first or second co-catalyst on a dehydrated filler.

6. The method of claim 2 wherein said treated filler is prepared by solvent deposition of the first or second co-catalyst on a dehydrated filler.

7. The method of claim 3 wherein said treated filler is prepared by solvent deposition of the first or second co-catalyst on a dehydrated filler.

8. The method of claim 4 wherein said treated filler is prepared by solvent deposition of the first or second co-catalyst on a dehydrated filler.

9. The method of claim 1 wherein the filler is a rubber reinforcing carbon black.

10. The method of claim 1 wherein the filler is a precipitated silica.

11. The method of claim 1 wherein said first co-catalyst is cyclopentadienyl titanium dichloride.

12. The method of claim 2 wherein said first co-catalyst is cyclopentadienyl titanium dichloride.

13. The method of claim 3 wherein said first co-catalyst is cyclopentadienyl titanium dichloride.

14. The method of claim 4 wherein said first co-catalyst is cyclopentadienyl titanium dichloride.

15. The method of claim 5 wherein said first co-catalyst is cyclopentadienyl titanium dichloride.

16. The method of claim 6 wherein said first co-catalyst is cyclopentadienyl titanium dichloride.

17. The method of claim 7 wherein said first co-catalyst is cyclopentadienyl titanium dichloride.

18. The method of claim 8 wherein said first co-catalyst is cyclopentadienyl titanium dichloride.

19. The method of claim 1 wherein said second co-catalyst is at least one of an organoaluminum compound selected from trialkyl aluminum, dialkylaluminum halide or ethylaluminum dichloride; a dialkyl zinc, and alkylmagnesium halide; wherein said alkyl groups for said organoaluminum compound, dialkyl zinc and alkylmagnesium halide are selected from at least one of the group consisting of methyl, ethyl and butyl groups.

20. The method of claim 1 wherein said second co-catalyst is selected from at least one of triethylaluminum, tributylaluminum, trimethylaluminum, ethylaluminum dichloride, triisobutylaluminum, dialkylzinc and butyl magnesium chloride.

21. The method of claim 2 wherein said second co-catalyst is at least one of an organoaluminum compound selected from trialkyl aluminum, dialkylaluminum halide or alkylaluminum dihalide; a dialkyl zinc, and alkylmagnesium halide; wherein said alkyl groups for said organoaluminum compound, dialkyl zinc and alkylmagnesium halide are selected from at least one of the group consisting of methyl, ethyl and butyl groups.

22. The method of claim 2 wherein said second co-catalyst is selected from at least one of triethylaluminum, tributylaluminum, trimethylaluminum, ethylaluminum dichloride, triisobutylaluminum, dialkylzinc and butyl magnesium chloride.

23. The method of claim 3 wherein said second co-catalyst is at least one of an organoaluminum compound selected from trialkyl aluminum, dialkylaluminum halide or ethylaluminum dichloride; a dialkyl zinc, and alkylmagnesium halide; wherein said alkyl groups for said organoaluminum compound, dialkyl zinc and alkylmagnesium halide are selected from at least one of the group consisting of methyl, ethyl and butyl groups.

24. The method of claim 3 wherein said second co-catalyst is selected from at least one of triethylaluminum, tributylaluminum, trimethylaluminum, ethylaluminum dichloride, triisobutylaluminum, dialkylzinc and butyl magnesium chloride.

25. The method of claim 4 wherein said second co-catalyst is at least one of an organoaluminum compound selected from trialkyl aluminum, dialkylaluminum halide or ethylaluminum dichloride; a dialkyl zinc, and alkylmagnesium halide; wherein said alkyl groups for said organoaluminum compound, dialkyl zinc and alkylmagnesium halide are selected from at least one of the group consisting of methyl, ethyl and butyl groups.

26. The method of claim 4 wherein said second co-catalyst is selected from at least one of triethylaluminum, tributylaluminum, trimethylaluminum, ethylaluminum dichloride, triisobutylaluminum, dialkylzinc and butyl magnesium chloride.

27. The method of claim 5 wherein said second co-catalyst is at least one of an organoaluminum compound selected from trialkyl aluminum, dialkylaluminum halide or ethylaluminum dichloride; a dialkyl zinc, and alkylmagnesium halide; wherein said alkyl groups for said organoaluminum compound, dialkyl zinc and alkylmagnesium halide are selected from at least one of the group consisting of methyl, ethyl and butyl groups.

28. The method of claim 5 wherein said second co-catalyst is selected from at least one of triethylaluminum, tributylaluminum, trimethylaluminum, ethylaluminum dichloride, triisobutylaluminum, dialkylzinc and butyl magnesium chloride.

29. The method of claim 6 wherein said second co-catalyst is at least one of an organoaluminum compound selected from trialkyl aluminum, dialkylaluminum halide or ethylaluminum dichloride; a dialkyl zinc, and alkylmagnesium halide; wherein said alkyl groups for said organoaluminum compound, dialkyl zinc and alkylmagnesium halide are selected from at least one of the group consisting of methyl, ethyl and butyl groups.

30. The method of claim 6 wherein said second co-catalyst is selected from at least one of triethylaluminum, tributylaluminum, trimethylaluminum, ethylaluminum dichloride, triisobutylaluminum, dialkylzinc and butyl magnesium chloride.

31. The method of claim 7 wherein said second co-catalyst is at least one of an organoaluminum compound selected from trialkyl aluminum, dialkylaluminum halide or ethylaluminum dichloride; a dialkyl zinc, and alkylmagnesium halide; wherein said alkyl groups for said organoaluminum compound, dialkyl zinc and alkylmagnesium halide are selected from at least one of the group consisting of methyl, ethyl and butyl groups.

32. The method of claim 7 wherein said second co-catalyst is selected from at least one of triethylaluminum, tributylaluminum, trimethylaluminum, ethylaluminum dichloride, triisobutylaluminum, dialkylzinc and butyl magnesium chloride.

33. The method of claim 8 wherein said second co-catalyst is at least one of an organoaluminum compound selected from trialkyl aluminum, dialkylaluminum halide or ethylaluminum dichloride; a dialkyl zinc, and alkylmagnesium halide; wherein said alkyl groups for said organoaluminum compound, dialkyl zinc and alkylmagnesium halide are selected from at least one of the group consisting of methyl, ethyl and butyl groups.

34. The method of claim 8 wherein said second co-catalyst is selected from at least one of triethylaluminum, tributylaluminum, trimethylaluminum, ethylaluminum dichloride, triisobutylaluminum, dialkylzinc and butyl magnesium chloride.

35. The method of claim 9 wherein said second co-catalyst is at least one of an organoaluminum compound selected from trialkyl aluminum, dialkylaluminum halide or ethylaluminum dichloride; a dialkyl zinc, and alkylmagnesium halide; wherein said alkyl groups for said organoaluminum compound, dialkyl zinc and alkylmagnesium halide are selected from at least one of the group consisting of methyl, ethyl and butyl groups.

36. The method of claim 9 wherein said second co-catalyst is selected from at least one of triethylaluminum, tributylaluminum, trimethylaluminum, ethylaluminum dichloride, triisobutylaluminum, dialkylzinc and butyl magnesium chloride.

37. The method of claim 11 wherein said second co-catalyst is at least one of an organoaluminum compound selected from trialkyl aluminum, dialkylaluminum halide or ethylaluminum dichloride; a dialkyl zinc, and alkylmagnesium halide; wherein said alkyl groups for said organoaluminum compound, dialkyl zinc and alkylmagnesium halide are selected from at least one of the group consisting of methyl, ethyl and butyl groups.

38. The method of claim 11 wherein said second co-catalyst is selected from at least one of triethylaluminum, tributylaluminum, trimethylaluminum, ethylaluminum dichloride, triisobutylaluminum, dialkylzinc and butyl magnesium chloride.

39. The method of claim 12 wherein said second co-catalyst is at least one of an organoaluminum compound selected from trialkyl aluminum, dialkylaluminum halide or ethylaluminum dichloride; a dialkyl zinc, and alkylmagnesium halide; wherein said alkyl groups for said organoaluminum compound, dialkyl zinc and alkylmagnesium halide are selected from at least one of the group consisting of methyl, ethyl and butyl groups.

40. The method of claim 12 wherein said second co-catalyst is selected from at least one of triethylaluminum, tributylaluminum, trimethylaluminum, ethylaluminum dichloride, triisobutylaluminum, dialkylzinc and butyl magnesium chloride.

41. The method of claim 13 wherein said second co-catalyst is at least one of an organoaluminum compound selected from trialkyl alkyluminum, dialkylaluminum halide or ethylaluminum dichloride; a dialkyl zinc, and alkylmagnesium halide; wherein said alkyl groups for said organoaluminum compound, dialkyl zinc and alkylmagnesium halide are selected from at least one of the group consisting of methyl, ethyl and butyl groups.

42. The method of claim 13 wherein said second co-catalyst is selected from at least one of triethylaluminum, tributylaluminum, trimethylaluminum, ethylaluminum dichloride, triisobutylaluminum, dialkylzinc and butyl magnesium chloride.

43. The method of claim 14 wherein said second co-catalyst is at least one of an organoaluminum compound selected from trialkyl aluminum, dialkylaluminum halide or ethylaluminum dichloride; a dialkyl zinc, and alkylmagnesium halide; wherein said alkyl groups for said organoaluminum compound, dialkyl zinc and alkylmagnesium halide are selected from at least one of the group consisting of methyl, ethyl and butyl groups.

44. The method of claim 14 wherein said second co-catalyst is selected from at least one of triethylaluminum, tributylaluminum, trimethylaluminum, ethylaluminum dichloride, triisobutylaluminum, dialkylzinc and butyl magnesium chloride.

45. The method of claim 1 wherein said conjugated diene is selected from at least one of isoprene and 1,3-butadiene and said vinyl aromatic compound is selected from at least one of styrene and alpha-methylstyrene.

46. The method of claim 2 wherein said conjugated diene is selected from at least one of isoprene and 1,3-butadiene and said vinyl aromatic compound is selected from at least one of styrene and alpha-methylstyrene.

47. The method of claim 3 wherein said conjugated diene is selected from at least one of isoprene and 1,3-butadiene and said vinyl aromatic compound is selected from at least one of styrene and alpha-methylstyrene.

48. The method of claim 5 wherein said conjugated diene is selected from at least one of isoprene and 1,3-butadiene and said vinyl aromatic compound is selected from at least one of styrene and alpha-methylstyrene.

49. The method of claim 6 wherein said conjugated diene is selected from at least one of isoprene and 1,3-butadiene and said vinyl aromatic compound is selected from at least one of styrene and alpha-methylstyrene.

* * * * *